United States Patent
Scot et al.

(10) Patent No.: US 10,641,902 B2
(45) Date of Patent: May 5, 2020

(54) METHOD OF COLLABORATIVE DETERMINATION OF POSITIONING ERRORS OF A SATELLITE-BASED NAVIGATION SYSTEM

(71) Applicant: CENTRE NATIONAL D'ETUDES SPATIALES, Paris (FR)

(72) Inventors: Gaël Scot, Toulouse (FR); Denis Laurichesse, Tournefeuille (FR)

(73) Assignee: CENTRE NATIONAL D'ETUDES SPATIALES, Paris (FR)

(*) Notice: Subject to any disclaimer, the term of this patent is extended or adjusted under 35 U.S.C. 154(b) by 430 days.

(21) Appl. No.: 15/508,296

(22) PCT Filed: Sep. 2, 2015

(86) PCT No.: PCT/EP2015/070047
§ 371 (c)(1),
(2) Date: Mar. 2, 2017

(87) PCT Pub. No.: WO2016/034622
PCT Pub. Date: Mar. 10, 2016

(65) Prior Publication Data
US 2017/0307761 A1     Oct. 26, 2017

(30) Foreign Application Priority Data

Sep. 5, 2014  (FR) .................................... 14 58336

(51) Int. Cl.
*G01S 19/07* (2010.01)
*G01S 19/40* (2010.01)
(Continued)

(52) U.S. Cl.
CPC .............. *G01S 19/07* (2013.01); *G01S 19/25* (2013.01); *G01S 19/40* (2013.01); *G01S 5/0221* (2013.01); *G01S 5/0263* (2013.01)

(58) Field of Classification Search
CPC .......... G01S 19/07; G01S 19/25; G01S 19/40; G01S 5/0221; G01S 5/0263
(Continued)

(56) References Cited

U.S. PATENT DOCUMENTS 5,867,411 A  * 2/1999 Kumar .................... G01S 19/04
                                                           375/232
6,397,147 B1 * 5/2002 Whitehead ............. G01S 19/41
                                                           342/357.24
(Continued)

FOREIGN PATENT DOCUMENTS

DE       102011051100 A1     12/2012

OTHER PUBLICATIONS

International Search Report for PCT/EP2015/070047, dated Nov. 25, 2015.
(Continued)

*Primary Examiner* — Chuong P Nguyen
(74) *Attorney, Agent, or Firm* — Burris Law, PLLC

(57) ABSTRACT

The positioning signals broadcast by GNSS constellations are affected by significant errors, notably due to the crossing of the ionospheric layer or of the tropospheric layer. Several unwieldy means have been deployed to provide professional users with corrections of said errors. These means, however, all require the knowledge of at least one precise reference point at a given distance. According to the invention, positioning receivers that are not very precise, such as smartphones, present in a geographical zone, of unknown precise position, can contribute to the production of precise atmospheric error corrections if said receivers are sufficiently numerous.

28 Claims, 4 Drawing Sheets

(51) Int. Cl.
*G01S 19/25* (2010.01)
*G01S 5/02* (2010.01)

(58) Field of Classification Search
USPC .......... 342/357.44, 465, 463, 357.23, 357.64
See application file for complete search history.

(56) References Cited

U.S. PATENT DOCUMENTS

| | | | | |
|---|---|---|---|---|
| 6,701,253 | B2* | 3/2004 | Edwards | G01S 19/05 |
| | | | | 342/357.42 |
| 7,289,061 | B2* | 10/2007 | Komjathy | G01S 19/07 |
| | | | | 342/357.31 |
| 7,656,352 | B2* | 2/2010 | Alban | G01S 19/04 |
| | | | | 342/458 |
| 7,741,994 | B2* | 6/2010 | Pande | G01S 19/07 |
| | | | | 342/357.44 |
| 8,305,266 | B2* | 11/2012 | Damidaux | G01S 19/07 |
| | | | | 342/357.44 |
| 9,244,174 | B2* | 1/2016 | Averin | G01S 19/07 |
| 10,288,743 | B2* | 5/2019 | Rapoport | G01S 19/40 |
| 2007/0027624 | A1* | 2/2007 | Powe | G01S 5/009 |
| | | | | 701/469 |
| 2012/0119944 | A1* | 5/2012 | Chen | G01S 19/32 |
| | | | | 342/26 A |
| 2012/0127032 | A1 | 5/2012 | McClure | |
| 2016/0370466 | A1* | 12/2016 | Rougerie | G01S 19/32 |
| 2018/0188378 | A1* | 7/2018 | Rapoport | G01S 19/43 |
| 2019/0004180 | A1* | 1/2019 | Jokinen | G01S 19/07 |
| 2019/0094385 | A1* | 3/2019 | Laurichesse | G01S 19/22 |
| 2019/0339710 | A1* | 11/2019 | Sorensen | B25J 13/006 |

OTHER PUBLICATIONS

Written Opinion for PCT/EP2015/070047, dated Nov. 25, 2015.
Nicholson et al., "Validation of a Tropospheric Voxel Tomography Model in a Regional GPC Network", GNSS 2004—Proceedings of the 17th International Technical Meeting of the Satellite Division of the Institute of Navigation (ION GNSS 2004), the Institute of Navigation, 8551 Rixlew Lane Suite 360, Manassas, VA, 20109, USA, Sep. 24, 2004 (Sep. 24, 2004), pp. 2386-2395.
Angrisano, A, Gaglione, S, Gioia, C, Massaro, M, Robustelli, U, Santamaria, R (2011). Ionospheric models comparison for single-frequency GNSS positioning. ENC 2011.
Klobuchar, John A., "Ionospheric time-delay algorithm for single-frequency GPS users", IEEE Transactions on aerospace and electronic systems, vol. AES-23, No. 3, pp. 325-331, May 3, 1987.
RTK Fundamentals from Navipedia, http://www.navipedia.net/index.php/RTK_Fundamentals, pp. 1-4, downloaded Feb. 14, 2017.
CODE's Global Ionosphere Maps (GIM), "Global Ionosphere Maps Produced by CODE", http://aiuws.unibe.ch/ionosphere/, pp. 1-4, downloaded Feb. 14, 2017.

* cited by examiner

METHOD OF COLLABORATIVE DETERMINATION OF POSITIONING ERRORS OF A SATELLITE-BASED NAVIGATION SYSTEM

FIELD OF THE INVENTION

The present invention applies to systems for aiding satellite-based navigation. More precisely, the aim of the invention is to produce information making it possible to determine the positioning errors resulting from the use of a satellite-based navigation signal.

BACKGROUND

The first constellation of satellites transmitting positioning signals was put in place for military applications by the American State (Global Positioning System or GPS) at the start of the 1980s. Since then, GPS signals have been used by professional civil applications (management of fleets of lorries, aids to aerial navigation, geodesic surveys, etc.), and henceforth for general-public applications (automobile navigation with onboard terminals and pedestrian navigation with terminals of smartphone type). Other constellations were put in place by the Russian State (GLONASS) and the Chinese State (Baïdou). A constellation of European satellites (Galileo) is undergoing deployment. Generally, these navigation systems are designated by the acronym GNSS (Global Navigation Satellite Systems).

The basic principle of aiding satellite-based positioning and navigation is the calculation by a receiver furnished with electronic processing circuits of position, velocity and time (PVT) data on the basis of electromagnetic signals of centimetric wavelength transmitted by satellites in orbit. The calculation of the PVT data by a receiver on the basis of the signals of the satellites is affected by numerous errors of various types: impact of the crossing by the electromagnetic signals of the various layers of the atmosphere (troposphere, ionosphere), errors due to the reflections of the signals on objects in the neighbourhood of the receiver (multipaths), clock errors, errors of the electronic processing circuits, etc. For military applications, these errors are corrected notably through the use of the properties of the signals transmitted on reserved carriers (P(Y) code of GPS). Specific means of multi-sensor processing and fusion are furthermore generally envisaged in order to guarantee precision and integrity of measurements intended for critical uses. But these solutions are restricted and expensive.

To meet the increasing need for precision in civil applications, diverse means have been developed to correct the main errors: acquisition of signals originating from several constellations, improvement of antennas to increase the robustness of reception, correlation loops in the receivers, differential GPS which calls upon fixed base stations which broadcast a reference signal making it possible to correct the errors, terrestrial networks for broadcasting correction information, fusion of the satellite data with data of the motion sensors onboard the receiver, or giving receiver trajectory information (mapping, terrain models), etc.

In particular, the errors due to the crossing of the ionosphere by the signals transmitted by the radionavigation satellites weigh heavily in the global toll of the positioning errors (4 standard deviations, according to the publication by A Angrisano et al., "Ionospheric models comparison for single-frequency GNSS positioning", ENC 2011, 12/2011, http://pang.uniparthenope.it/node/64). Several types of techniques for correcting these ionospheric errors may be employed in the state of the art.

A dual-frequency receiver can thus use a linear combination of the pseudo-distances calculated on the basis of signals of each of the frequencies. The ionospheric error being strongly correlated with the frequencies, it will be able to be eliminated by said combination. However, dual-frequency receivers are not yet widespread among the general public. Furthermore, the convergence time to a stabilized measurement is relatively long (possibly reaching as much as half an hour).

It is also possible to use, notably with receivers using a single frequency, corrections calculated by error models based on an estimation of the total electron content of the corresponding atmospheric layers ionized by the ultraviolet part of the solar radiation. One of the state of the art models is that of Klobuchar ("Ionospheric time-delay algorithm for single-frequency GPS users", IEEE Transactions on aerospace and electronic systems, Volume AES-23, N.3, 325-331). However, the seasonal, daily and spatial fluctuations of the models are such that the calculations are complex and that it is difficult to attain a precision which can be guaranteed for a time bounded to a few seconds for calculating the corrections and making them available.

A method making it possible to guarantee at one and the same time fast convergence, precision and integrity is the acquisition of specialized signals containing corrections calculated on the basis of the differences between the known positions of fixed stations belonging to a network and the positions calculated on the basis of the navigation signals of a GNSS constellation. These so-called "augmentation" systems (Satellite Based Augmentation Systems or SBAS) have a coverage which is regional for the calculation of the corrections and for their broadcasting or local for GBAS (Ground Based Augmentation Systems). The operational systems comprise notably EGNOS in Europe (European Geostationary Navigation Overlay Service), and WAAS in the United States (Wide Area Augmentation System). These various SBAS systems require an infrastructure which is unwieldy and expensive in terms of investment and utilization, notably reference ground stations operating under guaranteed conditions of dependability and precision, an intensive calculation centre, communication links between the ground segment and a geostationary satellite-based telecommunications network, and specific receivers. Today, these costs limit the use of these services, and therefore the positioning precision that they afford, to critical (aerial navigation) or professional services.

Less expensive approaches consist in simultaneously using the code of the GNSS positioning signal and the phase of its carrier (optionally on two frequencies), the receiver being positioned in relation to a fixed station of known position so as to remove the cycle ambiguity regarding the calculation of pseudo-distance on the basis of the carrier phase. These approaches, which can have several variants, are known by the name Real Time Kinematics (or RTK). An RTK system can only operate with at least one fixed station and the differential positioning with respect to this station will be precise only in a radius of the order of 10 to 20 km around this station. It is therefore used only for professional applications whose integrity constraints and radius of coverage are less than those addressed by SBAS systems, by coastal maritime navigation and geodesic surveys.

A limitation which is common to the differential approaches of SBAS and RTK type is that of requiring the use of reference stations whose position is known very precisely and of calculation algorithms which process the entirety or the major part of the errors with equivalent precision. This limitation restricts the access of users of general-public terminals furnished with standard GNSS signal acquisition capabilities to greater positioning precision.

SUMMARY OF THE INVENTION

The invention affords a solution to this problem by generating a map of the ionospheric errors of sufficient precision on the basis of terminals for receiving GNSS signals whose position may not be known precisely, and optionally whose onboard processing capability may be limited.

For this purpose, the invention discloses a method of determination by a computer server of errors in calculating a position calculated by user receivers of positioning signals received from at least one constellation of satellites in a determined geographical zone, said method comprising: determining a list of contributing receivers Ri of positioning signals situated in said geographical zone Zj, a position of said contributing receivers not being known a priori; extracting, for each of the contributing receivers Ri, code Ci and phase $\Phi_i$ data of at least one channel of the receiver; a step of calculating an atmospheric error Ii applicable in the zone to the contributing receivers Ri, code Ci and phase $\Phi_i$ data of at least one channel of the contributing receiver; and calculating an atmospheric error I(Zj) applicable in the zone Zj, on the basis of the errors Ii applicable to the contributing receivers Ri.

Advantageously calculating the atmospheric error Ii consists in calculating only the ionospheric error for at least one contributing receiver Ri.

Advantageously, calculating the atmospheric error Ii consists in calculating at least the tropospheric error for at least one contributing receiver Ri.

Advantageously, the tropospheric error for the at least one contributing receiver Ri is calculated as the sum of a first delay termed the wet delay (SWD) and of a second delay termed the hydrostatic delay SHD.

Advantageously, calculating the atmospheric error I(Zj) receives as input the ionospheric errors of the contributing receivers Ri and a tropospheric error applicable in the geographical zone Zj originating from an external source of provisioning information.

Advantageously, determining at least one part of the list of contributing receivers Ri (2221, 2222) situated in said geographical zone uses data of localization of said receivers in relation to at least one base station of a cellular radiocommunications network.

Advantageously, the method of the invention furthermore comprises classifyinng pairs of code Ci and phase $\Phi_i$ data of channels of a receiver Ri, said classifying step using a weighted combination of criteria comprising criteria representative of one or more of a signal-to-noise ratio of the channel or an elevation of the satellite axis of the channel.

Advantageously, calculating an ionospheric error Ii applicable to the receiver Ri comprises subtracting said code Ci and phase $\Phi_i$ data.

Advantageously, an integer ambiguity of the phase $\Phi_i$ is neglected.

Advantageously, the method of the invention further comprises calculating a quality index IQ(Ii) of the ionospheric error Ii applicable to the receivers Ri.

Advantageously, the quality index IQ(Ii) is calculated by a weighted combination of criteria comprising criteria representative of one or more of a signal-to-noise ratio of a channel of the receiver Ri, an elevation of a satellite axis acquired by the receiver Ri, a number of satellite axes acquired.

Advantageously, the quality index IQ(Ii) further depends on parameters characterizing one or more of a hardware or a software configuration of the receiver Ri.

Advantageously, the errors Ii of the receivers Ri whose quality index IQ(Ii) is less than a threshold value Thresh1 have a zero weighting in calculating an ionospheric error I(Zj) applicable in the zone Zj.

Advantageously, the ionospheric error I(Zj) applicable in the zone Zj is a linear combination of the errors Ii weighted by the quality indices IQ(Ii).

Advantageously, the method of the invention further comprises filtering values I(Zj) by a model of ionospheric errors.

Advantageously, the method of the invention further comprises determining a confidence indicator of the ionospheric error I(Zj).

Advantageously, the confidence indicator of the ionospheric error I(Zj) is dependent on a number Nj of contributing receivers Ri whose quality index IQ(Ii) is greater than Thresh1.

Advantageously, the ionospheric error I(Zj) is replaced, when its confidence indicator is less than a predetermined threshold value Thresh2, by a value I(Z) calculated by one or more of a spatial or a temporal interpolation within a set of values of ionospheric errors calculated for neighbouring geographical zones or periods.

Advantageously, the method of the invention further comprises making values of ionospheric errors I(Zj) available to the user receivers.

Advantageously, the method of the invention further comprises acquiring by the user receivers of a position determined by a server (230).

Advantageously, the method of the invention further comprises calculating a position corrected by fusion of the PVT data of the user receiver and of the values of ionospheric errors I(Zj).

The invention also discloses a method for correcting a position calculation performed by a user receiver of positioning signals received from at least one constellation of satellites in a determined geographical zone, said method comprising at least: acquiring from a server an atmospheric error I(Z) calculated by a procedure of fusion by said server of atmospheric errors determined from a plurality of contributing receivers situated in the geographical zone, a position of said contributing receivers not being known a priori; fusioning the atmospheric error acquired with the PVT point calculated by the user receiver.

The invention also discloses a collaborative system for aiding the positioning of user receivers of positioning signals received from at least one constellation of satellites in at least one geographical zone, said system comprising a plurality of hardware and computer code elements configured to: determine a list of contributing receivers Ri of positioning signals situated in said geographical zone Zj, a position of said contributing receivers not being known a priori; extract, for each of the contributing receivers Ri, code Ci and phase $\Phi_i$ data of at least one channel of the receiver; calculate an atmospheric error Ii applicable to the contributing receivers Ri from said code Ci and phase $\Phi_i$ data; calculate an atmospheric error I(Zj) applicable in the zone Zj, from the errors Ii of the contributing receivers Ri; make available to the user receivers at least one result of the calculation of atmospheric error in said at least one geographical zone.

Advantageously, a processor of at least one contributing receiver Ri is configured to perform the calculation of atmospheric error Ii applicable to said contributing receiver Ri from said code Ci and phase $\Phi_i$ data, the result of said calculation being transmitted to a server (230) through a communication link.

Advantageously, code Ci and phase $\Phi_i$ data of at least one channel of at least one contributing receiver Ri are transmitted to a server (230) through a communication link, a processor of said server being configured to perform the calculation of atmospheric error Ii applicable to said contributing receiver Ri from said code Ci and phase $\Phi_i$ data.

The invention also discloses a server of positioning data, said server comprising: circuit logic configured to determine a list of contributing receivers Ri situated in a geographical zone; processing logic configured to acquire with a determined frequency temporal sequences of data transmitted by the contributing receivers Ri of said list, said temporal sequences comprising one or more of: i) tcode and phase of at least one channel of each of the contributing receivers Ri, or, ii) a datum calculated from said code and said phase; data logic configured to calculate a temporal sequence of atmospheric errors applicable in said geographical zone; a link to make available to user receivers said temporal sequence of atmospheric errors.

The invention also discloses a receiver of positioning signals, comprising: a memory for storing temporal sequences of data comprising: i) one or more of code and phase of at least one channel of the receiver, or, ii) a datum calculated from the code and of the phase, and; iii) at least one quality index of said data, said index being chosen from a group comprising a signal-to-noise ratio of the channel, an elevation of a satellite axis corresponding to said channel, and a number of satellite axes acquired; and a communication link configured to teletransmit said temporal sequences stored in a memory of the receiver to a pre-identified remote server with a predetermined frequency.

The invention also discloses a receiver of positioning signals, comprising: a communication link configured to tele-receive with a predetermined frequency temporal sequences of data of the server of positioning data according to the invention; and circuit logic configured to calculate a corrected position from a PVT point calculated by the receiver and said temporal sequences of data.

Another advantage of the invention is to allow faster convergence of the calculation of precise position (quasi-instantaneous convergence can be envisaged) by virtue of the information which would be shared about the ionosphere and optionally the troposphere.

According to the invention, in certain embodiments, it is possible to determine at one and the same time, separately or in combination, the ionospheric errors and the tropospheric errors (each of these errors constituting the atmospheric errors).

Another advantage of the invention is that of providing a calculation of position corrected of the ionospheric errors, making it possible to obtain, under most conditions of use, a global precision of positioning of the same order of magnitude as that provided by SBAS systems, when the number of terminals in a given geographical zone is sufficient (without however the same integrity guarantees).

Another advantage of the invention is that of authorizing the recombination of the corrections of ionospheric errors obtained of the invention with positioning data of variable precision obtained moreover so as to obtain a global precision level which will be able to depend, on the one hand, on the configuration of the receiver possibly allowing it to acquire and process the data of this or that precise positioning service, and on the other hand on the reception conditions just where said receiver is located.

The position data used to initialize the position calculation in a GNSS receiver can for example be data calculated by another means provided either by a radiocommunication, cellular or WiFi-terminal-based network, or by a cartographic means. Another advantage of the invention, coupled with these initialization means, is then that of allowing faster acquisition of the GNSS signals by a receiver entering a given geographical zone or exiting a masking zone.

Furthermore, the invention is sufficiently versatile for its implementation to cope with several types of architectures making it possible to obtain a contribution of correction data according to different modalities of receivers having variable onboard calculation capabilities.

BRIEF DESCRIPTION OF THE DRAWINGS

The invention will be better understood and its various characteristics and advantages will emerge from the description of its various embodiments and the following figures appended to the present request.

DETAILED DESCRIPTION OF THE INVENTION

Figure 1:
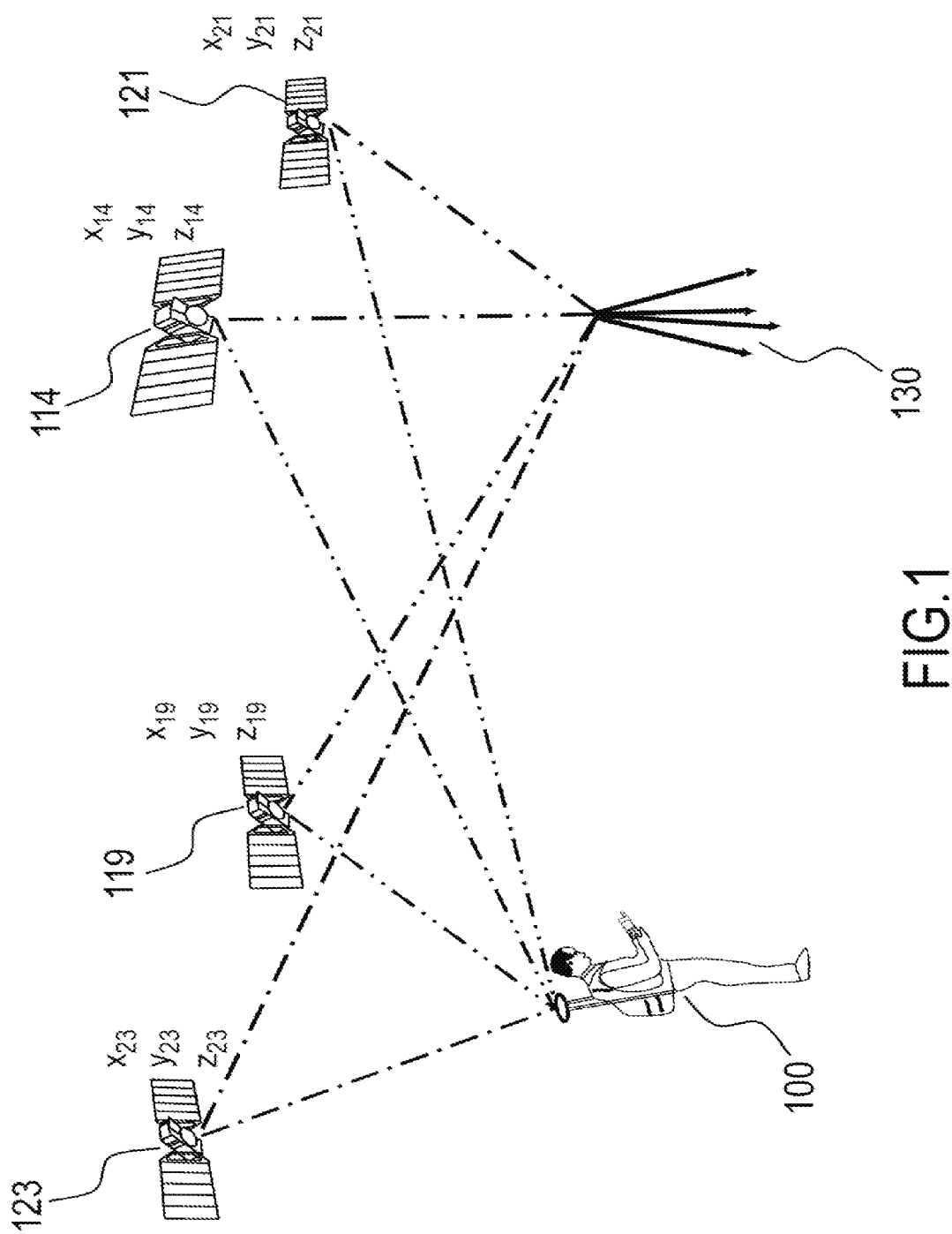
FIG. 1 represents a basic view of a system of RTK type according to the prior art.

FIG. 1 represents a basic view of an RTK system according to the prior art.

In a positioning system of differential type, a user 100 receives positioning signals for at least one constellation of satellites, 114, 119, 121, 123. The positioning signals for said satellites are also received by a reference station 130. The user 100 can be mobile. The reference station 130 must be fixed, of precisely known position and situated in a radius of about 10 to 20 km from the user (see http://www.navidedia.net/index.php/RTK_Fundamentals).

An algorithm of RTK type can be implemented by using the code, the phase or a combination of the two, if appropriate with variable weightings. The precision is better when the phase is used, since its measurement is less noisy than that of the code, at the price of greater complexity, notably in order to remove the cycle ambiguity.

The basic equation of an algorithm of RTK type uses the following expression for calculating the phase $\Phi$ of a carrier (one per satellite axis):

$$\Phi = \rho - I + T_r + c(b_{Rx} - b_{Sat}) + N\lambda + \varepsilon_\Phi \quad (1)$$

in which equation:
$\rho$ is the geometric expression of the pseudo-distance calculated as a function of the cartesian coordinates of the satellite $(x_{Sat}, y_{Sat}, z_{Sat})$ and of the receiver $(x_{Rx}, y_{Rx}, z_{Rx})$;
I is the delay of the signal due to crossing the ionosphere;
$T_r$ is the delay of the signal due to crossing the troposphere;
c is the velocity of light in vacuo;
$b_{Rx}$ is the bias of the clock of the receiver with respect to the GNSS reference time;

$b_{Sat}$ is the bias of the clock of the satellite with respect to the GNSS reference time;

N is the ambiguity of the phase of the carrier;

λ is the nominal wavelength of the carrier;

$\varepsilon_\Phi$ summarizes the measurement noise, notably the multipaths.

ρ is given by the following equation:

$$\rho = \sqrt{(x_{Sat} - x_{Rx})^2 + (y_{Sat} - y_{Rx})^2 + (z_{Sat} - z_{Rx})^2} \quad (2)$$

The ionospheric and tropospheric errors have already been commented on. The clock biases do not call for any particular comment. The cycle ambiguity in the phase measurement is to within N cycles, N being an integer. For the frequency of a carrier L1 of a GPS system (1575.42 MHz), an ambiguity of one cycle represents a disparity of 20 cm. To obtain centimetric precision, it is therefore necessary to resolve the cycle ambiguity or integer ambiguity.

If one takes the double difference of the phase measurements of the receivers 100 and 130 for, for example, the satellites 121 and 123, the following equation is obtained:

$$\Phi_{100}^{121,123} - \Phi_{130}^{121,123} = \rho_{100}^{121,123} - \rho_{130}^{121,123} - I_{100}^{121,123} + I_{130}^{121,123} + Tr_{100}^{121,123} - Tr_{130}^{121,123} + \lambda(N_{100}^{121,123} - N_{130}^{121,123}) + \varepsilon_{100}^{121,123} - \varepsilon_{130}^{121,123} \quad (3)$$

Whether one uses just the code, just the phase or a combination of the two, the precision of the position measurement of the receiver of the user 100 will be of the same order of magnitude as the precision of the various terms of equation (3), or of the equivalent equations for the code and code/phase combination variants, with a precision equivalent to the precision of the positioning which must be provided. To obtain metric precision, it is thus necessary to ascertain the position of the reference station with identical precision, thereby in practice excluding the possibility of it being mobile. It is also necessary to calculate the various error terms with the same precision, this being very difficult for the ionospheric error, having regard to the multiple factors which affect it.

The idea of the inventors has therefore been to be able to use, for the ionosphere specifically, measurements that are of lesser precision but that are potentially very numerous since they result from the contribution of a large number of, potentially mobile, stations.

Figure 2:
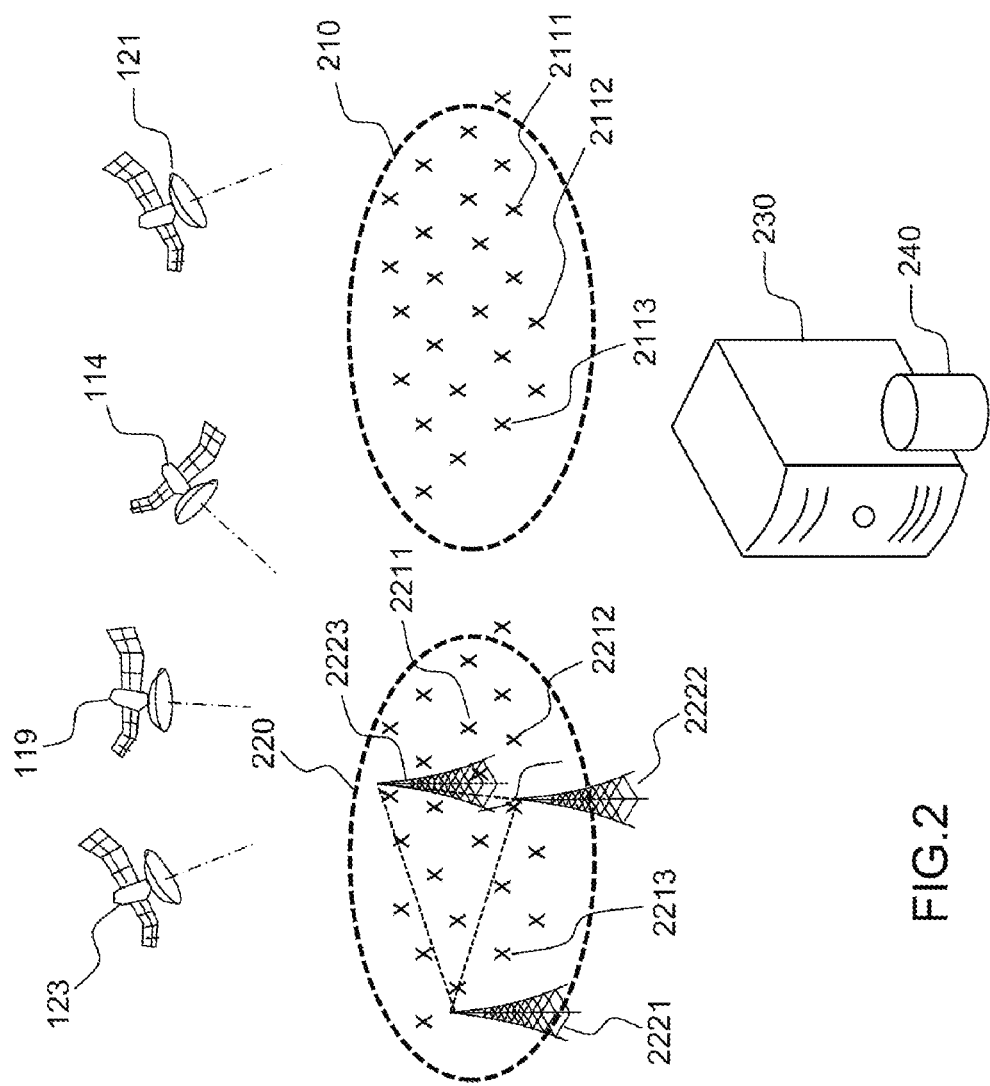
FIG. 2 represents an architecture diagram for implementing the invention, in several of its embodiments.

FIG. 2 represents an architecture diagram for implementing the invention, in several of its embodiments.

The invention can be implemented with the satellites of the constellation of the prior art, 114, 119, 121, 123.

Geographical zones 210, 220 are defined within which the measurements of receivers 2111, 2112, 2113, 2211, 2212, 2213, notably, which are active in said geographical zones, contribute to a global calculation of ionospheric errors. Advantageously, the geographical zones 210, 220, have a mesh which may be of the order of a few kilometres (for example between 1 and 10 km). A server 230 managed by a provider of positioning data 240 can receive data from the receivers and transmit same thereto.

The receivers can be of all types, mono-frequency or multifrequency, able to pick up the signals of a single GNSS constellation or of several, furnished or not with antennas suitable for attenuating the effects of the multipaths, and aided or not by an inertial hybridization or a mapping. They are also coupled to a module allowing them to transmit and receive data by RF pathway. In particular, simple smartphones, comprising a standard GPS microchip, can be integrated into the measures.

The receivers 2111, 2112, 2211, 2212) may be solely contributors, that is to say may provide the server 230, and/or other receivers, with raw or summarized data making it possible to calculate the map of the ionospheric error in the zones 210, 220, without being users thereof. This may in particular be the case for vehicles of commercial or administrative fleets (public transport, taxis, ambulances, postal vehicles, lorries, etc.) equipped with means of precise positioning and receiving precision data.

The receivers 2113, 2213, may be solely users, that is to say may receive positioning data without contributing their own position data.

The receivers may also be contributors and users simultaneously or successively.

To implement the invention, the receivers must be able to provide as a minimum the code and the phase of the raw navigation signals. If the position of the receiver must be determined on the basis of the GNSS signal, the minimum number of satellite axes must be four. If the position of the receiver is determined by another means, as indicated hereinbelow, this is not necessary. A selection of the best signals will nonetheless be carried out. It is also possible to generate a summary signal, according to the modalities described hereinbelow as commentary to FIG. 3. The raw signals or the summary signal are thereafter transmitted by RF pathway to the server 230.

The zones 210 and 220 differ from one another in that the second comprises base stations 2221, 2222, 2223 of a cellular radiocommunications network which are equipped with transmit relay antennas. These antennas may belong to different operators, or optionally be rented by operators that do not have their own network of base stations. The operator of a radiocommunications network is able to ascertain at any instant the base station to which an active terminal of one of its subscribers is attached. The precision of the position of the subscriber therefore varies as a function of the density of the cells, therefore from a hundred or so metres to a few kilometres. With the proviso that he can have access to these data, the provider of positioning data 240 is therefore able to ascertain the receivers that are active in the geographical zone 220, thereby making it possible to initialize the method of the invention, without the precise position of the receiver being known, as indicated hereinbelow. In this case, the transmission or the calculation of a GNSS position is therefore not necessary. It must on the other hand be possible to identify receivers that are located in the geographical zone 210, not covered by cells of a radiocommunications network of an operator with whom the positioning operator has negotiated an agreement to share data. It is on the other hand necessary either to calculate a position on the basis of the raw code and phase data used moreover to calculate the ionospheric error, or the data, or to acquire the PVT (Point Velocity Time) data at the output of the receiver.

Figure 3:
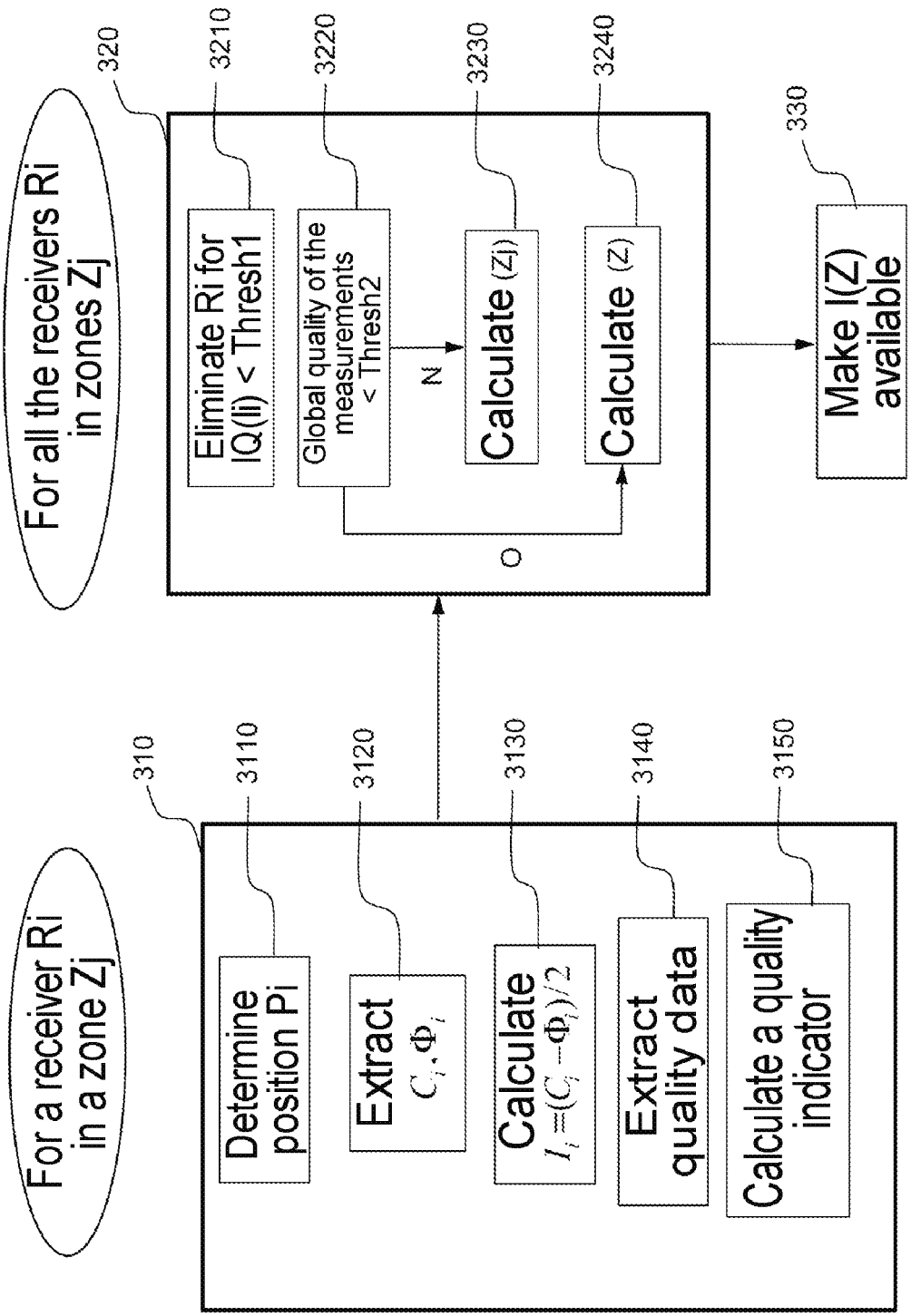
FIG. 3 represents a general flowchart of the processing actions for determining the ionospheric errors, according to several embodiments of the invention.

FIG. 3 represents a general flowchart of the processing actions for determining the ionospheric errors according to several embodiments of the invention.

The contributors to the cooperative production of the positioning data according to the invention by the provider 240 are furnished with communicating positioning receivers, 2111, etc., designated in FIG. 3 by Ri, having the characteristics indicated hereinabove. The contributors are registered by the provider 240, which also registers the identifiers of their GNSS receiver and of their radiocommunication receiver, as well as, optionally, the configuration characteristics of said receivers. The contributors must give, at the moment of their registration, their consent to the permanent collection of their location data for the needs of the service. In return for this consent, the data provider 240 will make the necessary legal and contractual undertakings in compliance with the provisions of the countries in which he operates regarding the protection of personal data. Optionally, the data provider will be able to collect the geo-location coordinates of the cellular network base stations onto which the receiver Ri is successively locked.

The processing actions for carrying out the invention are, on the one hand, implemented for each of the receivers Ri of the contributors located in a zone Zj (processing actions 310), and on the other hand are implemented by the entirety of the zones Zj served by the provider of positioning data (processing action 320). The positioning data produced by the processing actions 320, and optionally by external processing actions, are thereafter made available to the users and contributors/users of the service (processing action 330).

The processing actions relating to each receiver Ri can be carried out according to variants of the invention, either in the receiver itself, or in the server 230. Likewise certain processing actions applicable in a concomitant manner to all the receivers Ri of a zone Zi can also be carried out either on each of the receivers, or on the server.

A reasonable frequency of the processing actions for updating the data of the server 230, and therefore for extracting and/or calculating the data required at the level of the receivers and/or of the server, is of the order of a few minutes (between 1 and 5 min, for example, for the information relating to the ionosphere, and probably 1 min for the information about the troposphere).

As regards the processing actions 310 relating to a receiver Ri:

In the course of a step 3110, a position of the receiver Ri is determined; this position may be that provided to the receiver by the GNSS constellation or a position provided by the contributor's radiocommunications operator, as indicated above; in the first case, it must be transmitted to the server 230 so that the receiver Ri is assigned to the zone Zj in the time interval considered;

In the course of a step 3120, the code and phase of one or more carriers on a certain number of satellite axes are extracted from the GNSS receiver Ri; the code and phase of one or more carriers on the satellite axis giving the best quality (for example, the best signal-to-noise ratio and the most significant elevation) are preserved so as to be processed in the course of the following steps;

The outputs of step 3120 can be processed in the receiver or transmitted raw to the server 230 so as to be processed therein; the processing 3130 consists in calculating the ionospheric error at the position Pi by performing the sum of the code and of the phase of the positioning signal for the satellite axis retained for the carrier or carriers, as explained further on;

In parallel, in the course of a step 3140, the quality data corresponding to the best satellite axis, as well as summary data, such as, for example, the number of satellite axes locked on, are extracted so as to be processed, either in the receiver, or on the server in the course of a step 3150 of calculating a synthetic quality index; if it is produced by the receiver, the synthetic quality index IQ(Ii) of the receiver Ri is transmitted to the server 230; by default, as a variant, the raw quality data themselves are transmitted to the server.

The calculation of Ii is performed on the basis of equations (1), relating to the phase, and (4) hereinbelow, relating to the code, for each of the satellite axes:

$$C = \rho + I + T_r + c(b_{Rx} - b_{Sat}) + \varepsilon_c \quad (4)$$

Where $\varepsilon_c$ is the measurement noise relating to the code.

By bringing together equations (1) and (4), we obtain the ionospheric error affecting the GNSS positioning signal received by the receiver Ri at the position Pi:

$$I_i = (C_i - \Phi_i)/2 - N\lambda + (\varepsilon_c - \varepsilon_\Phi) \quad (5)$$

At the metric (and not decimetric or less) order of magnitude wherein the favoured field of application of the present invention lies, the integer ambiguity $N\lambda$ can be neglected (it is of the order of 10 to 50 cm) in the case of a mono-frequency receiver. The residual value of the ambiguity $N\lambda$ will be processed by the positioning filter of the receiver. In the case of a dual-frequency receiver, the integer ambiguity is resolved by the standard processing of the receiver. Moreover, the assumption is made that the estimator for the measurement noise in the code and the phase is Gaussian noise of zero mean, thereby making it possible, according to the invention, to delete said noise from the calculations without loss of precision in the calculation of an ionospheric correction applicable in the zone Zj, on condition that it is possible to use a sufficient number of measurements of receivers in the zone Zj.

As regards the processing actions 320 relating to all the receivers of a zone Zj:

We begin, in the course of a step 3210, by eliminating from the subsequent calculations all the receivers whose quality index IQ(Ii) is less than an acceptance threshold; this threshold is defined on the basis of the criteria indicated above, or of others specific to the zone Zj or to the measurement period; likewise, the acceptability level may be different as a function of the characteristics of the zone and of the period; by way of example, a signal-to-noise ratio of less than 30 dB or an elevation of the satellite axis of less than 15° will make it possible to discard the corresponding measurements; another example could be an indicator as to the multipath environment quality detected in the signal;

it may, in the course of a step 3220, be decided that no ionospheric error measurement point will be provided for the zone Zj because of an insufficiency in the number of acceptable measurements in said zone; in this case, it will be possible despite everything to provide a point I(Z) calculated, in the course of a step 3230, on the basis of an interpolation of the measurements of the neighbouring zones or epochs, of interpolation techniques discussed further on;

if the number of acceptable measurements is sufficient, then the ionospheric error I(Zj) is calculated, in the course of a step 3240, by taking the mean of the Ii output by equation (5) of the receivers Ri that are active in the zone Zj, whose measurements satisfy the quality indicator threshold.

As a variant, the measurements aggregated during step 3240 can be weighted by their quality indicator. As second variant, a second weighting can be performed as a function of an indicator calculated on the server, for each receiver featuring in the database of the provider, on the basis of the configuration parameters of said receiver. It is for example possible to use the characteristics of the antennas, of the microchip, notably the code noise indicated by the provider of the receiver.

The data I(Z) are thereafter placed at the disposal of the users and users/contributors according to modalities which will be explained further on as commentary to FIG. 4.

According to the size, the position on the terrestrial globe of the zone Z for which the measurements are insufficient, and according to the number and the position relative to that of Z, of the neighbouring zones Zj for which usable data exist, it will be possible to carry out a linear interpolation or else to use an interpolation based on spherical harmonics, according to formulae known to the person skilled in the art. It is possible to refer for example to the following reference: http://aiuws.unibe.ch/ionosphere/. Within this framework, it is possible to compare the measurements in the zone Z (moreover just like in the zones Zj) with a state model and to apply a filtering, for example Kalman filtering, to them through the state model.

It is also possible to use an interpolation on the basis of measurements in the same zone or in neighbouring zones, either at close earlier epochs, or at epochs that are comparable from the point of view of the characteristics having an impact on the ionospheric error (season, time of day, weather, etc.).

The atmospheric error is normally the sum of the ionospheric and tropospheric errors. It is possible, however, to decide to neglect one of the two, the atmospheric error taken into account then being reduced to the other. The tropospheric error is customarily decomposed into two terms: the wet delay or SWD, for Slant Wet Delay which represents the contribution of water vapour and corresponds to about 10% of the total tropospheric delay and the hydrostatic delay (SHD, for Slant Hydrostatic Delay) which represents the remaining contribution and can be calculated on the basis of the equation of hydrostatic equilibrium. The determination of the tropospheric error is proposed for example by the international organization IGS. The IGS is a sparse worldwide network of stations. The drawback of a sparse network is that the tropospheric error will be precise only in proximity to the stations. It is therefore important to have a dense network of stations in order to make a precise evaluation thereof. Organisations such as the IGN in France which operates this kind of dense network carry out a determination of the tropospheric error. Access to this error customarily requires a commercial agreement.

The description of the invention given for the ionospheric error is adapted in the following manner to determine at least one of the contributions (wet delay, hydrostatic delay) of the tropospheric error.

The main requirement which differs with respect to the determination of the ionospheric contribution is the need for the precise knowledge, preferably submetric or less, of the position of the receiver in order to perform the calculation. The person skilled in the art will have no difficulty in implementing the mathematical steps either gleaned from the foregoing description or from the literature.

In the method for the determination of the tropospheric error, after the step of determining the error, based on the precise position of the receiver, comes the step of transmitting this error which is done without transmitting the precise position. Indeed, since the troposphere varies only very little on a kilometric scale, a position of an order of magnitude of a kilometre is generally sufficient.

According to a first variant of the invention, only the ionospheric error is determined. According to a second variant, the tropospheric component is determined by an external means such as that of the IGN network in France. The atmospheric error is then the sum of this tropospheric error with the ionospheric error determined according to the invention. According to a third variant, the tropospheric error alone is determined according to the invention. According to a fourth variant, the tropospheric and ionospheric error is determined, simultaneously or successively by the same receivers. According to a fifth variant, a combination of the previous variants is implemented so as to exploit the environment and peculiarities and capability of the various receivers. Thus, the presence of at least one receiver having capabilities for precise positioning (PPP) in a geographical zone about 1 km in diameter can allow the system to acquire the tropospheric errors applicable in said geographical zone and to retransmit them to the other subscribers after integration of the ionospheric error.

Figure 4:
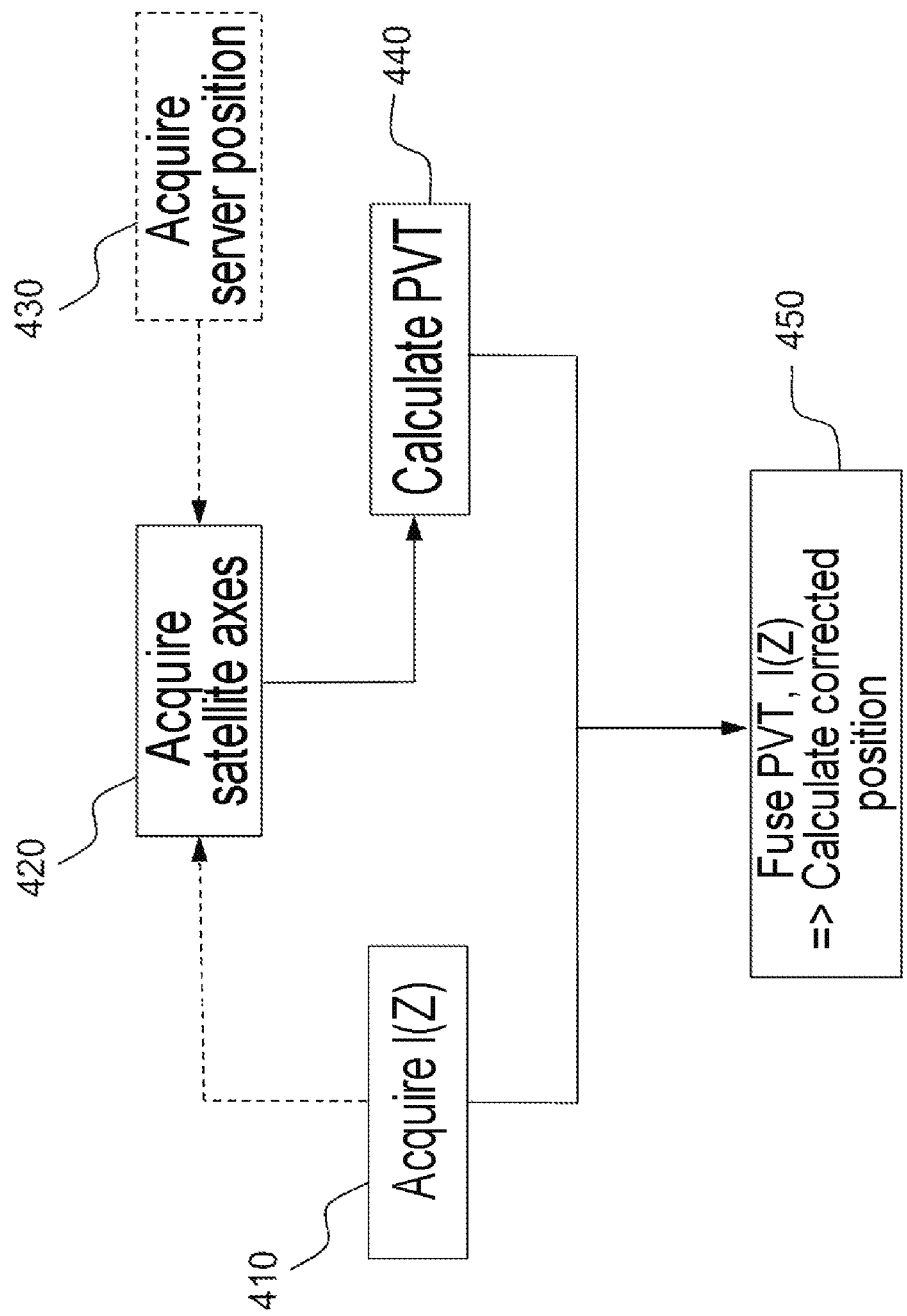
FIG. 4 represents a general flowchart of the processing actions for a use of the data of a server of positioning data, according to several embodiments of the invention.

FIG. 4 represents a general flowchart of the processing actions for a use of the data of a server of positioning data, according to several embodiments of the invention.

The data made available on the server 230 can be transmitted to the receivers of the users in multicast mode, or withdrawn on the server, either by an automatic procedure, or by a request procedure of said receivers addressed to said server. The distribution of the data of the server can be performed either by message or in http or https mode. A combination of the various modes of distribution is possible, according to the invention.

Step 410 consists of this broadcasting in multicast mode or the request addressed to the server.

In the course of a step 420, the receiver acquires the satellite axis or axes in sight.

In the course of an optional step 430, the receiver position determined by the server according to a variant of the invention, on the basis of data of the mobile radiocommunications operator to which the user of the receiver is subscribed. This step makes it possible, combined with the ionospheric error data I(Z) applicable to the receiver, to shorten the delay in acquiring the satellite axes and the convergence delay of the following step of calculating the PVT on the basis of the satellite axes.

In the course of a step 440, the uncorrected PVT positioning data are calculated by the receiver.

In the course of a step 450, the PVT data are corrected by fusion with the data I(Z) transmitted by the server.

According to the invention, the precision of the position measurement provided by the GNSS system is improved by fusion with the data relating to the ionospheric errors transmitted by the server 230. Likewise, notably in the variant comprising the step of using the server position data, the time for acquisition and the time for convergence of the calculations are also improved.

The examples described hereinabove are only illustrative of some of the embodiments of the invention. They do not in any way limit the scope of the invention which is defined by the claims which follow.

The invention claimed is:

1. A method of providing by a computer server of errors in calculating a position corrected by user receivers of positioning signals received from at least one constellation of satellites in a determined geographical zone, said method comprising:

determining a list of contributing receivers of positioning signals situated in said geographical zone, a position of said contributing receivers not being known a priori;

extracting, for each of the contributing receivers Ri, code Ci and phase $\Phi_i$ data of at least one channel of the contributing receiver;

calculating an atmospheric error Ii applicable to each contributing receiver Ri on the basis of said code Ci and phase $\Phi_i$ data;

calculating an atmospheric error I(Zj) applicable in the zone Zj, on the basis of the errors Ii applicable to the contributing receivers Ri; and making available to at least one of the user receivers the calculated atmospheric error I(Zj) applicable in the zone Zj for correction of the positioning signals.

2. The method of claim 1, wherein calculating the atmospheric error Ii consists in calculating only the ionospheric error for all the contributing receivers Ri.

3. The method of claim 1, wherein calculating the atmospheric error Ii consists in calculating at least the tropospheric error for at least one contributing receiver Ri.

4. The method of claim 3, wherein the tropospheric error for the at least one contributor receiver Ri is calculated as a sum of a first delay termed the wet delay and of a second delay termed the hydrostatic delay SHD.

5. The method of claim 1, wherein calculating the atmospheric error I(Zj) receives as input the ionospheric errors of the contributing receivers Ri and a tropospheric error applicable in the geographical zone Zj originating from an external source of provisioning information.

6. The method of claim 1, wherein determining at least one part of the list of contributing receivers Ri situated in said geographical zone uses data of localization of said receivers in relation to at least one base station of a cellular radiocommunications network.

7. The method of claim 1, further comprising classifying pairs of code Ci and phase $\Phi_i$ data of channels of a receiver Ri, said classifying using a weighted combination of criteria comprising criteria representative of one or more of a signal-to-noise ratio of the channel or an elevation of the satellite axis of the channel.

8. The method of claim 1, wherein calculating the atmospheric error Ii applicable to the receiver Ri comprises subtracting said code Ci and phase $\Phi_i$ data.

9. The method of claim 8, wherein an integer ambiguity of the phase $\Phi_i$ is neglected.

10. The method of claim 1, further comprising calculating a quality index IQ(Ii) of the atmospheric error Ii applicable to the receivers Ri.

11. The method of claim 10, wherein the quality index IQ(Ii) is calculated by a weighted combination of criteria comprising criteria representative of one or more of a signal-to-noise ratio of a channel of the receiver Ri, an elevation of a satellite axis acquired by the receiver Ri, a number of satellite axes acquired.

12. The method of claim 10, wherein the quality index IQ(Ii) further depends on parameters characterizing one or more of a hardware or a software configuration of the receiver Ri.

13. The method of claim 10, wherein the atmospheric errors Ii of the receivers Ri whose quality index IQ(Ii) is less than a threshold value Thresh1 have a zero weighting in calculating an atmospheric error I(Zj) applicable in the zone Zj.

14. The method of claim 13, wherein the confidence indicator of the ionospheric error I(Zj) is dependent on a number Nj of contributing receivers Ri whose quality index IQ(Ii) is greater than Thresh1.

15. The method of claim 10, wherein the atmospheric error I(Zj) applicable in the zone Zj is a linear combination of the atmospheric errors Ii weighted by the quality indices IQ(Ii).

16. The method of claim 10, further comprising filtering values I(Zj) by a model of atmospheric errors.

17. The method of one of claim 1, her comprising determining a confidence indicator of the atmospheric error I(Zj).

18. The method of claim 1, wherein the atmospheric error I(Zj) is replaced, when its confidence indicator is less than a predetermined threshold value Thresh2, by a value I(Z) calculated by one or more of a spatial or a temporal interpolation within a set of values of atmospheric errors calculated for neighbouring geographical zones or periods.

19. The method of claim 1, further comprising making values of the atmospheric error I(Zj) available to the user receivers.

20. The method of claim 19, further comprising acquiring by the user receivers of a position determined by a server.

21. The method of claim 19, further comprising calculating a position corrected by fusion of the PVT data of the user receiver and of the values of the atmospheric error I(Zj).

22. A collaborative system for aiding the positioning of user receivers of positioning signals received from at least one constellation of satellites in at least one geographical zone, said system comprising a plurality of hardware and computer code elements configured to:
determine a list of contributing receivers of positioning signals situated in said geographical zone, a position of said contributing receivers not being known a priori;
extract, for each of the contributing receivers Ri, code Ci and phase $\Phi_i$ data of at least one channel of the receiver;
calculate an atmospheric error Ii applicable to the contributor receivers Ri from said code Ci and phase $\Phi_i$ data;
calculate an atmospheric error I(Zj) applicable in the zone Zj, from the errors Ii of the contributor receivers Ri;
make available to the user receivers at least one result of the calculation of atmospheric error in said at least one geographical zone.

23. The system of claim 22, wherein a processor of at least one contributing receiver Ri is configured to perform the calculation of atmospheric error Ii applicable in the zone to said contributing receiver Ri from said code Ci and phase $\Phi_i$ data, the result of said calculation being transmitted to a server through a communication link.

24. The system of claim 22, wherein code Ci and phase $\Phi_i$ data of at least one channel of at least one contributing receiver Ri are transmitted to a server through a communication link, a processor of said server being configured to perform the calculation of atmospheric error Ii applicable in the zone to said contributor receiver Ri from said code Ci and phase $\Phi_i$ data.

25. A server of positioning data, said server comprising:
circuit logic configured to determine a list of contributing receivers situated in a geographical zone;
processing logic configure to acquire with a determined frequency temporal sequences of data transmitted by the contributing receivers Ri of said list, said temporal sequences comprising one or more of:
code and phase of at least one channel of each of the contributing receivers Ri, or
a datum calculated from said code and said phase
data logic configured to calculate a temporal sequence of atmospheric errors applicable in said geographical zone;
a link to make available to user receivers said temporal sequence of atmospheric errors.

26. A contributing receiver of positioning signals, comprising:
a memory for storing temporal sequences of data comprising:
one or more of code and phase of at least one channel of the receiver, or a datum calculated from the code and of the phase,
and at least one quality index of said data, said index being chosen from a group comprising a signal-tonoise ratio of the channel, an elevation of a satellite axis corresponding to said channel, and a number of satellite axes acquired;

a communication link configured to teletransmit said temporal sequences stored in a memory of the receiver to a preidentified remote server with a predetermined frequency.

27. A user receiver of positioning signals, comprising:

a communication link configured to tele-receive with a predetermined frequency temporal sequences of data of the server of positioning data of claim 26;

circuit logic configured to calculate a corrected position from a PVT point calculated by the receiver and said temporal sequences of data.

28. A method of providing a corrected position calculation performed by a user receiver of positioning signals received from at least one constellation of satellites in a determined geographical zone, said method comprising:

acquiring from a server according to claim 25 an atmospheric error I(Z) calculated by a procedure of fusion according to claim 1 by said server of atmospheric errors determined from a plurality of contributing receivers situated in the geographical zone, a position of said contributing receivers not being known a priori;

fusing the atmospheric error acquired with the PVT point calculated by the user receiver.

* * * * *